United States Patent Office 3,397,201
Patented Aug. 13, 1968

3,397,201
5,6 - DIHYDRO - 2 - (SUBSTITUTED) - 6 - PHENYL-3,4,5 - TRIMETHYL - 4H - 1,3,4 - OXADIAZINIUM HALIDES
Donald L. Trepanier, Indianapolis, Ind., assignor to The Dow Chemical Company, Midland, Mich., a corporation of Delaware
No Drawing. Filed Apr. 8, 1966, Ser. No. 541,088
2 Claims. (Cl. 260—244)

ABSTRACT OF THE DISCLOSURE 5,6 - dihydro - 2 - (substituted)-6-phenyl-3,4,5-trimethyl-4H-1,3,4-oxadiazinium halides are prepared by the reaction of a 4,5 - dimethyl - 2 - (substituted)-6-phenyl-5,6-dihydro-4H-1,3,4-oxadiazine compound with methyl bromide or methyl iodide. Typical substituents in the 2 position are halophenyl, alkylphenyl and alkoxyphenyl. The compounds are useful as pesticides.

---

This invention is directed to novel 5,6-dihydro-2-(substituted) - 6-phenyl-3,4,5-trimethyl-4H-1,3,4-oxadiazinium halide corresponding to the formula

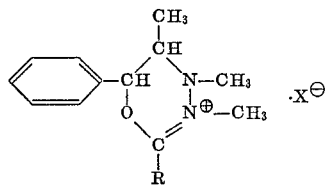

In the present specification and claims X represents bromide or iodide and R represents a member of the group consisting of mono-chlorophenyl, lower alkoxyphenyl and lower alkylphenyl. As employed herein the terms "lower alkyl" and "lower alkoxy" are employed to refer to alkyl and alkoxy groups containing from 1 to 4 carbon atoms, inclusive. The compounds of the present invention are crystalline solids that are fairly soluble in methanol, dimethylformamide, dimethylsulfoxide and acetonitrile. These compounds have been found to be useful as pesticides for the control of worms, fish, insects, arachnids and plants, including such representative organisms as ascarids, hookworms, tapeworms, whipworms, flies, cockroaches, mites, trashfish, crabgrass and certain leguminous plants.

The new compounds of the present invention are prepared by reacting methyl iodide or methyl bromide with a 4,5 - dimethyl-2-(substituted)-6-phenyl-5,6-dihydro-4H-1,3,4-oxadiazine corresponding to the formula

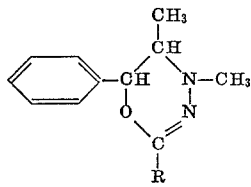

The reaction is carried out in the presence of an inert organic solvent as reaction medium and proceeds readily at temperatures of from 25° to 150° C. and conveniently at the boiling temperature of the reaction mixture. The proportions of the reactants to be employed is not critical, some of the desired product being obtained when combining the reactants in any proportions. However, the reaction consumes the reactants in substantially equimolar proportions and the use of the reactants in such proportions is preferred.

In carrying out the preparation of the 5,6-dihydro-2-(substituted) - 6 - phenyl - 3,4,5-trimethyl-4H-1,3,4-oxadiazinium bromide and iodide compounds of the present invention, the reactants and the inert reaction medium are contacted together in any order or fashion. Representative inert organic liquid reaction mediums include acetone, methanol, ether and ethanol. The reaction mixture is then heated at a temperature within the reaction temperature range for a period of time. In a convenient procedure, the reaction mixture is heated at the boiling temperature and under reflux for a short period of time. In those cases where the product precipitates in the reaction mixture as a solid material, it can be separated by such conventional procedures as filtration, decantation or centrifugation. In other operations, the reaction mixture may be fractionally distilled under reduced pressure to remove the low boiling constituents and obtain the product as a solid residue. The product separated as described above may be employed in pesticidal applications or further purified by such conventional techniques as washing or recrystallization.

Representative 4,5 - dimethyl-2-(substituted)-6-phenyl-5,6-dihydro-4H-1,3,4-oxadiazine starting materials include 4,5 - dimethyl - 2 - (p-ethylphenyl)-6-phenyl-5,6-dihydro-4H - 1,3,4-oxadiazine; 4,5-dimethyl-2-(p-propylphenyl)-6-phenyl - 5,6-dihydro-4H-1,3,4-oxadiazine; 4,5-dimethyl-2-(p-butylphenyl)-6-phenyl-5,6-dihydro-4H-1,3,4-oxadiazine; 4,5-dimethyl-2-(o-ethylphenyl)-6-phenyl-5,6-dihydro-4H-1,3,4-oxadiazine; 4,5-dimethyl-2-(p-propoxyphenyl)-6-phenyl-5,6-dihydro-4H-1,3,4-oxadiazine; and 4,5-dimethyl-2-(o-ethoxyphenyl)-6-phenyl-5,6-dihydro-4H-1,3,4-oxadiazine.

The following examples are merely illustrative and are not intended to be limiting.

Example 1

4,5 - dimethyl - 2 - (o-methoxyphenyl)-6-phenyl-5,6-dihydro-4H-1,3,4-oxadiazine (10 grams) and iodomethane (20 milligrams) were contacted together in 200 milliliters of ethanol. The reaction mixture was thereafter heated at the boiling temperature and under reflux for 18 hours. Following the heating period, the reaction mixture was concentrated in vacuo and the concentrate placed in the refrigerator for several hours. During the refrigeration period the product precipitated in the concentrated reaction mixture as a crystalline solid. This 5,6-dihydro-2-(o-methoxyphenyl) - 6 - phenyl - 3,4,5 - trimethyl-4H-1,3,4-oxadiazinium iodide product was found to melt at 152°–153° C. with decomposition.

Example 2

4,5-dimethyl-2-(p-chlorophenyl) - 6-phenyl-5,6-dihydro-4H - 1,3,4 - oxadiazine (4.8 grams and bromomethane (8 milliliters) were dispersed in 50 milliliters of acetone. The reaction mixture was then poured into a closed pressure bottle and allowed to stand at room temperature for 5 days. Following this period the reaction mixture was filtered to remove the crystalline solid product which had precipitated in the reaction mixture. The crystalline solid 5,6 - dihydro-2-(p-chlorophenyl)-6-phenyl - 3,4,5 - trimethyl-4H-1,3,4-oxadiazinium bromide was separated by filtration, washed with ether and recrystallized from ethanol. The recrystallized product melted at 208°–209° C. with decomposition.

The following compounds of the present invention are prepared in a similar manner.

5,6 - dihydro-2,6-diphenyl - 3,4,5 - trimethyl-4H-1,3,4-oxadiazinium iodide (melting point 186–187° C. with decomposition) by reacting together 4,5-dimethyl-2,6-diphenyl-5,6-dihydro-4H-1,3,4-oxadiazine and iodomethane.

5,6 - dihydro-2-(p-methoxyphenyl)-6-phenyl - 3,4,5-trimethyl - 4H - 1,3,4-oxadiazinium bromide (melting point 216–217° C. with decomposition) by reacting together 4,5-dimethyl-2-(p-methoxyphenyl)-6-phenyl - 5,6 - dihydro-4H-1,3,4-oxadiazine and bromomethane.

5,6 - dihydro-2-(p-tolyl)-6-phenyl - 3,4,5 - trimethyl-4H - 1,3,4 - oxadiazinium bromide (melting point 214°–215° C. with decomposition) by reacting together 4,5-dimethyl-2-(p - tolyl)-6-phenyl-5,6-dihydro - 4H - 1,3,4-oxadiazine and bromomethane.

5,6 - dihydro-2-(o-ethoxyphenyl)-6-phenyl - 3,4,5 - trimethyl - 4H - 1,3,4-oxadiazinium bromide (melting point 187°–188° C. with decomposition) by reacting together 4,5 - dimethyl-2-(o - ethoxyphenyl)-6-phenyl-5,6-dihydro-4H-1,3,4-oxadiazine and bromomethane.

5,6 - dihydro-2-(p-ethoxyphenyl)-6-phenyl - 3,4,5 - trimethyl - 4H - 1,3,4-oxadiazinium bromide (melting point 229°–231° C. with decomposition) prepared by reacting together 4,5-dimethyl-2-(p-ethoxyphenyl)-6-phenyl - 5,6-dihydro-4H-1,3,4-oxadiazine and bromomethane.

5,6 - dihydro-2-(o-butoxyphenyl)-6-phenyl - 3,4,5-trimethyl-4H-1,3,4 - oxadiazinium bromide (melting point 197°–198° C. with decomposition) prepared by reacting together 4,5-dimethyl-2-(o-butoxyphenyl)-6-phenyl - 5,6-dihydro-4H-1,3,4-oxadiazine and bromomethane.

5,6 - dihydro-2-(p-chlorophenyl)-6-phenyl - 3,4,5 - trimethyl-4H-1,3,4-oxadiazinium iodide (melting point 183°–184° C. with decomposition) prepared by reacting together 4,5 - dimethyl-2-(p-chlorophenyl)-6-phenyl - 5,6-dihydro-4H-1,3,4-oxadiazine and iodomethane.

The compounds of the present invention are employed as the sole toxicant in pesticides to be employed for the control of various pests such as insects, worms, arachnids, trashfish and plants.

For such uses, the compounds can be employed in an unmodified form or dispersed on a finely divided solid and employed as dusts. Such mixtures also can be dispersed in water with or without the aid of a surface active agent, and the resulting aqueous suspensions employed as sprays. In other procedures, the products are employed as active constituents in solvent solution, oil-in-water or water-in-oil emulsions or aqueous dispersions. The augmented compositions are adapted to be distributed as concentrates and subsequently diluted with additional liquid or solid adjuvants to produce the ultimate treating compositions.

In representative operations, 100 percent kill of golden carp was obtained when 5,6-dihydro-2,6-diphenyl-3,4,5-trimethyl-4H-1,3,4-oxadiazinium iodide was added to the fish's aqueous environment as the sole toxicant and in an amount sufficient to provide the toxicant compound at a concentration of 0.4 part per million by weight. In other operations, aqueous compositions containing 5,6-dihydro-2-(p-chlorophenyl)-6-phenyl - 3,4,5 - trimethyl-4H-1,3,4-oxadiazinium bromide as the sole toxicant at a concentration of 4,000 parts per million gave substantially complete kills of crabgrass and bean plants. In other operations, aqueous compositions containing 5,6-dihydro-2-(o-methoxyphenyl)-6-phenyl - 3,4,5 - trimethyl-4H-1,3,4-oxadiazinium iodide as the sole toxicant at a concentration of 500 parts by weight gave substantially complete kills of house flies contacted therewith.

The compounds of the present invention corresponding to the formula

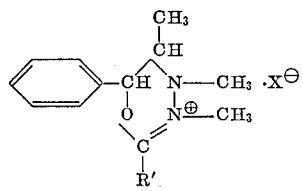

wherein R′ represents 4-methylphenyl, o-ethoxyphenyl, p-ethoxyphenyl, o-butoxyphenyl, and p-chlorophenyl can be employed as the sole toxicant in anthelmintic compositions. The anthelmintic compounds can be administered orally or intragastrically. For such uses the toxicant compound can be administered in the form of capsules, tablets or boluses, or dispersed in animal feed compositions. Such compositions are generally given as a single dose or at freqeunt intervals over a short period. Daily doses of about 50–100 mg. of the oxadiazinium compound per kilogram of animal body weight as either single or divided doses, can be employed. Administration of the compounds at these levels for just one day is normally adequate therapeutic treatment, although additional treatments may be employed without adverse results.

In such compositions, the toxic compound can be employed singly or intimately dispersed or dissolved in inert diluents or carriers. The toxic compound can be blended or mixed with innocuous orally ingestable nutrients, diluents, fillers, binders, lubricants, suspending agents and like excipients by conventional formulating techniques.

In representative operations, dogs known to be infected with hookworms (Ancyclostoma caninum) are administered a single hard gelatin capsule containing one of the above-described anthelmintic oxadiazinium compounds as the sole toxic constituent. In such operations 5,6-dihydro-2-(p-tolyl) - 6 - phenyl - 3,4,5 - trimethyl - 4H - 1,3,5-oxadiazinium bromide and 5,6-dihydro-2-(o-ethoxyphenyl)-6-phenyl - 3,4,5 - trimethyl - 4H - 1,3,5-oxadiazinium bromide, when employed at a dosage equivalent to 50 mg./kg. of body weight, each gives substantially complete kills of the hookworms as shown by necropsy of the test animal 5 days after administration of the toxicant compound. In other operations, the 5,6-dihydro-2-(p-tolyl)-6 - phenyl - 3,4,5 - trimethyl - 4H - 1,3,5 - oxadiazinium bromide compound, when employed in a hard gelatin capsule containing 100 milligrams of toxicant compound per kilogram of body weight gave 100 percent kill of Taenia coenurus (dog tapeworm). In still further operations, substantially complete kills of Ancyclostoma caninum were obtained in dogs fed a single hard gelatin capsule containing the 5,6-dihydro-2-(o-butoxyphenyl)-6-phenyl-3,4,5 - trimethyl-4H-1,3,4 - oxadiazinium bromide at a dose of 35 milligrams of toxicant per kilogram of body weight. The activity was observed by necropsy of the test animal 5 days after administration of the toxicant compound.

I claim:
1. The 5,6 - dihydro - 2 - (substituted)-6-phenyl-3,4,5-trimethyl-4H-1,3,4-oxadiazinium halide compound corresponding to the formula

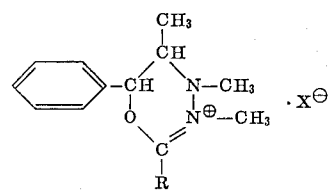

wherein R represents o-butoxyphenyl and X represents a member of the group consisting of iodide and bromide.

2. The oxadiazinium halide compound claimed in claim 1 wherein the compound is 5,6-dihydro-2-(o-butoxyphenyl) - 6 - phenyl - 3,4,5 - trimethyl-4H-1,3,4-oxadiazinium bromide.

References Cited

UNITED STATES PATENTS 3,122,537   2/1964   Trepanier _____ 260—244

OTHER REFERENCES

Trepanier et al. I: Jour. Org. Chem., vol. 29, pp. 668–72 (1964), QD 241. J6.

Trepanier et al. II: Jour. Org. Chem., vol. 29, pp. 2151–5 (1964), QD 241. J6.

JOHN D. RANDOLPH, Primary Examiner.

NATALIE TROUSOF, Assistant Examiner.